3,427,297
ACRYLAMIDE PERCHLORATES AND
POLYMERS THEREOF
James L. Chaille and Warren D. Niederhauser, Huntsville, Ala., and Al Kennedy, Fayetteville, Tenn., assignors to Rohm & Haas Company, Philadelphia, Pa., a corporation of Delaware
No Drawing. Filed Mar. 9, 1959, Ser. No. 798,291
U.S. Cl. 260—89.7                14 Claims
Int. Cl. C06b 3/00; C08f 3/90; C07c 103/12

This invention concerns the perchlorate salts of acrylamide and substituted acrylamides of the general formula:

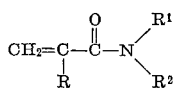

wherein R is a group selected from the group consisting of hydrogen and an alkyl group containing 1 to 8 carbon atoms, $R^1$ and $R^2$ are groups individually selected from the group consisting of hydrogen and lower alkyl, said lower alkyl group containing 1 to 8 carbon atoms, $R^1$ and $R^2$ being the same or different.

This invention also concerns an improved process for producing acrylamide perchlorate and substituted acrylamide perchlorates.

High energy monomers which are capable of polymerizing under relatively mild conditions to produce polymers which are elastomeric or which can be plasticized to produce compounds with elastomeric properties are of interest as components of solid propellant charges. When so polymerized and, if necessary, plasticized, they function as binders for the other components of the propellant charge.

Thus, one preferred method of making propellant "grains" or charges consists in casting a mixture of various additives plus a compound, which can be termed a "monomer," which will subsequently form an elastic tough rubbery polymer by condensation or polymerization reactions and function as a binder for the entire propellant charge. This method permits uniform dispersion of all components throughout the propellant mass and, more important, permits casting the mixture into casings or molds at relatively low safe temperatures. Obviously, with potentially explosive or highly combustible mixtures such as must be used for high energy propellants, the ability to cast these compositions satisfactorily at relatively low temperatures is a tremendously important safety factor. After casting, the monomeric compound is reacted to form a polymer, which polymer, as hereinbefore set forth, functions as a binder for the entire propellant charge.

Polymerizable high energy compounds are known which will, when polymerized, function as binders for solid propellant charges. However, many of these are characterized by being "exotic" being based on unusual chemicals not in good supply, being very expensive, and requiring complicated reactions for their formation and complex processes for their purification.

It would be advantageous if polymerizable monomers as set forth hereinbefore could be produced from raw materials or reactants which were readily available on a large scale. It would be a further advantage if the desired polymerizable monomer could be produced by a relatively straightforward process which could be readily scaled up to commercial large volume production. Although the economics of missile propellants are of less concern than they would be in most applications, if a polymerizable monomer exhibited the desired chemical and physical properties and was also low in cost, such low cost would obviously be an additional advantage.

It has been found that the perchlorate salts of acrylamide and substituted acrylamides exhibit the desired properties set forth hereinbefore. The reactants required for the manufacture of the perchlorate salts set forth hereinbefore are readily available in large quantities at relatively low cost. The monomeric and polymeric forms of these perchlorate salts exhibit high energy and the monomeric form can be polymerized in the presence of other components commonly used in solid propellant charges to produce charges or "grains" with the required physical and chemical properties.

The compounds of the present invention are prepared by reacting acrylamide or a substituted acrylamide with perchloric acid.

The term "free water" as used herein denotes any water present in the reaction mixture, which water is not associated with the perchlorate salt as water of hydration.

Although the molar ratios of the acrylamide and perchloric acid can be varied and still obtain the products of the present invention, the preferred embodiment employs a 1 to 1 molar ratio, or, most preferably, one mole of the acrylamide with a stoichiometric quantity of the commercially available concentrated perchloric acid, which commercially available concentrated perchloric acid is an aqueous solution of perchloric acid containing about 72% perchloric acid. Using this grade of perchloric acid, only one mole of water can be removed by agitating the reaction mixture under high vacuum, it being postulated that the other mole of water remains in hydrate form with the acrylamide perchlorate. The products so obtained are viscous liquids which form transparent plastics when polymerized as hereinafter set forth.

It is possible to use highly polar solvents, such as water, or lower alkanoic acids, such as acetic acid, as solvents for the reaction mixture, but it has been found that the disadvantageous effects which they produce frequently overcome the advantages which accrue from their use. The preferred embodiment uses no solvent, the only non-reactant being the water present in the perchloric acid. Many of the acrylamides and substituted acrylamides are solids, but are readily soluble in 72% perchloric acid to produce fluid solutions, particularly when added to the perchloric acid in pulverized form.

It is possible to remove the free water present in the reaction mixture of the most preferred embodiment of this invention at atmospheric pressure, but the best method for removing the free water from the reaction mixture comprises agitating the reaction mixture under vacuum, and removing the free water as it is formed. Any subatmospheric pressure can be employed, but the lower the pressure, the more rapid the rate of free water removal and the lower the temperature required to permit the reaction to be completed in a reasonable period of time. Pressures from about 0.5 to about 50 mm. of mercury will permit satisfactory removal, but a preferred range of pressures is 0.5 to 10 mm. of mercury The upper reaction temperature employed is controlled by two factors, namely the tendencey for the product to polymerize, and the fact that it is a high energy compound and, thus, unstable at elevated temperatures. As would be expected, too low a temperature prolongs unduly the removal of the free water, thus giving unnecessarily long reaction times which favor premature polymerization. For optimum reaction times, the temperature used will depend on the pressure employed. At the preferred pressures, namely 0.5 to 10 mm. of mercury, the preferred temperatures are in the range of 20° to 35° C.

The reaction time will necessarily vary, depending on the temperatures and pressures employed. Operating at the preferred range of pressures and temperatures as set forth hereinbefore, the reaction time will vary between about 30 minutes and about two hours. More specifically, operating at a pressure of 1 mm. and a temperature of 25° C., the reaction was complete in 90 minutes.

A wide variety of acrylamides and substituted amides can be used to produce the compounds of the present invention, typical examples being the following: acrylamide, methacrylamide, N-lower alkyl acrylamides and methacrylamides, in which the lower alkyl group contains 1 to 8 carbon atoms, such as N-methylacrylamide and N-octylacrylamide and the corresponding α-alkylacrylamides, N,N-dilower alkyl acrylamides and methacrylamides in which the lower alkyl groups are the same or different and contain from 1 to 8 carbon atoms, such as N,N - dimethylacrylamides, N,N - methylhexylacrylamides, and N,N-dioctylacrylamides and the corresponding α-alkylacrylamides, and α-alkyl substituted acrylamides in which the alkyl group contains 1 to 8 carbon atoms, such as methacrylamide, as set forth hereinbefore, and t-octylacrylamide. From the standpoint of use in propellant charges, the lower substituted acrylamides are preferred. Thus, the perchlorate salt of acrylamide is suitable, but it has been found that the polymerization behavior of methacrylamide perchlorate can be more readily controlled.

The acrylamide perchlorate monomers of the present invention may be polymerized to form homopolymers or they may be copolymerized with other ethylenically unsaturated polymerizable monomers to form copolymers. The use of copolymers as binders for propellant grains is particularly desirable in those instances in which it is desirable to modify the physical and chemical properties of the propellant grains.

Suitable comonomers include methyl acrylate, ethyl acrylate, butyl acrylate, 2-ethylhexyl acrylate and the higher alkyl esters of methacrylic and ethacrylic acids Esters of this type include the butyl, 2-ethylhexyl, decyl and lauryl esters of methacrylic and ethacrylic acids. The amount of these plasticizing esters used will depend on the other components of the propellant grain and the specific plasticizing monomer used. Generally, however, from 5% to 20% of plasticizing monomer, based on the weight of the acrylamide or methacrylamide will provide the desired degree of plasticization.

Other suitable monoethylenically unsaturated monomers including monovinylidene monomers include the following: propyl acrylate, isopropyl acrylate, tert-butyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxypropyl acrylate, ethoxyphenyl acrylate, ethoxybenzyl acrylate, ethoxycyclohexyl acrylate, and the corresponding esters of methacrylic acid, styrene, vinyltoluene, vinylnaphthalene, and similar unsaturated monomers.

Copolymers of the above monomers with monovinylene compounds, such as dialkyl maleates, dialkyl fumarates, dialkyl crotonates, dialkyl itaconates, and dialkyl glutaconates are also possible.

The molecular weights of the polymers of the present invention may be varied over wide ranges and still be within the scope of the invention. The term "molecular weights" as used herein refers to the weight average or viscosity average molecular weights. The polymers may be liquids of low molecular weight, viscous gums of higher molecular weights, to hard and tough solids of very high molecular weight depending on the intended use. Useful polymers can be prepared in which the polymer molecule contains as low as about 5 monomer units, which, depending on the specific monomer employed, is a molecular weight or viscosity molecular weight of about 2000. Polymers which contain as high as 5000 monomer units per polymer molecule are also useful. The preferred range is from 10 to 3000 monomer units per polymer molecule or "chain."

The physical properties of the polymers resulting from polymerizing the monomers of the present invention can be altered by copolymerizing said monomers with polyethylenically unsaturated compounds. Thus, it is possible to obtain cross-linked structures with varying degrees of cross-linking depending on the amount and composition of the polyethylenically unsaturated compounds used. The varying degrees of cross-linking are, in turn, accompanied by varying degree of thermoplasticity, rigidity and solubility in solvents. The ability to vary the physical properties of the polymers of this invention is not only of importance when they are employed as binders for propellant grains, but also when they are employed in other applications.

Suitable polyethylenically unsaturated compounds include the following: divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinyl sulfone, polyvinyl or polyallyl ethers of glycol, of glycerol, of pentaerylthritol, of mono-, or dithio-derivatives of glycols, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, 1,2-di(α-methylmethylene sulfonamido)-ethylene, trivinylbenzene, trivinylnaphthalene, polyvinylanthracenes, butadiene and isoprene.

The acrylamide perchlorates of the present invention can be polymerized, either alone or in a mixture with other copolymerizable ethylenically unsaturated compounds using a number of methods well known to those skilled in the art. Thus, compounds which provide free radicals will initiate polymerization.

Suitable catalysts which provide free radicals which function as reaction initiators include benzoyl peroxide, tert-butyl hydroperoxide, cumene peroxide, tetralin peroxide, acetyl peroxide, caproyl peroxide, tert-butyl perbenzoate, tert-butyl diperphthalate, and methyl ethyl ketone peroxide, etc.

The amount of peroxidic catalyst required is roughly proportional to the concentration of the mixture of monomers. The usual range is 0.01% to 3% of catalyst with reference to the weight of the monomer mixture. The preferred range is from 0.2% to 1.5%. The optimum amount of catalyst is determined in large part by the nature of the particular monomers selected, including the nature of the impurities which may accompany said monomers.

Another suitable class of free radical generating compounds are the azo catalysts. There may be used, for example, azodiisobutyronitrile, azodiisobutyramide, azobis (α,α - dimethylvaleronitrile), azobis(α-methylbutyronitrile), dimethyl, diethyl, or dibutyl azobis(methylvalerate). These and other similar azo compounds serve as free radical initiators. They contain a —N—N group attached to aliphatic carbon atoms, at least one of which is tertiary. An amount of 0.01% to 2% on the weight of monomer or monomers is usually sufficient.

While suitable physical properties can be obtained by copolymerizing acrylamide perchlorates with other ethylenically unsaturated compounds, the specific impulse developed by the propellant grain may be decreased appreciably, particularly if the amount of the other ethylenically unsaturated compounds used be an appreciable portion of the grain. Another method of plasticizing polymers of acrylamide perchlorates which represent the preferred embodiment uses polyhydric alcohols as plasticizers. The alcohols may be dihydric or trihydric, typical examples being ethylene glycol, triethylene glycol, propylene glycol, glycerol, and 1,2,6-hexane triol. The amounts of these plasticizers used will vary with the particular acrylamide perchlorate used and the physical properties required in the propellant grain, but will be in the range of about 5% to about 30% on the weight of the particular monomer used.

As set forth hereinbefore, the monomers of the present invention, when polymerized, are valuable as high energy binders for propellant grains. They are used in conjunction with an oxidizer, which oxidizer may vary widely in chemical composition. Thus, ammonium, lithium, sodium, or potassium perchlorates and nitrates or mixtures of these salts are commonly employed as oxidizers in propellant grains.

Powdered aluminum may be added as an additional fuel and to control the burning characteristics of the propellants.

The acrylamide perchlorate monomers of the present invention, alone or with the other components of the propellant grain, are reactive monomers and, even in the absence of catalysts, have relatively short "pot life." Thus, if the monomers or the unpolymerized propellant mixes are to be stored for any appreciable period of time, or if it is possible that there will be a delay between preparation and casting, a polymerization inhibitor should be employed. It is advisable to add the inhibitor at the beginning of the reaction between the acrylamide and the perchloric acid. Because perchloric acid is a strong oxidizing agent, the choice of inhibitors is limited to those which are substantially oxidation resistant. Typical suitable inhibitors are 2,3-dicyanobenzoquinone, N-nitrosodiphenylamine and methylene blue and sodium nitrite. The amounts required for satisfactory stabilization will vary, depending on the particular monomer or monomer mixture, the catalyst used, and the rate of polymerization desired. Generally, however, 0.005% to 1%, based on the combined weight of the acrylamide and the perchloric acid will provide adequate stabilization.

The polymers prepared by polymerizing alone, or in admixture with other ethylenically unsaturated polymerizable monomers, acrylamide perchlorates of the formula

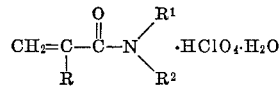

wherein R is a group selected from the group consisting of hydrogen and an alkyl group containing from 1 to 8 carbon atoms, $R^1$ and $R^2$ are groups individually selected from the group consisting of hydrogen and lower alkyl, said lower alkyl group containing 1 to 8 carbon atoms, and $R^1$ and $R^2$ being the same or different, find use as binders for propellant grains for use in missiles, such as rockets. They are of particular interest because the raw materials are readily available in quantity, at relatively low cost. Furthermore, propellant charges containing the monomeric form of these acrylamides can be readily cast in molds at low temperatures, and subsequently cured in said molds at low temperatures. The polymers exhibit low sensitivity to shock, the burning rates are in the desired range and can be easily modified, and the rheological properties are excellent.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

EXAMPLE I

One mole (71 grams) of pulverized acrylamide and 0.01 gram 2,3-dicyanobenzoquinone were charged to a three-neck round bottom flask equipped with a stirrer, and 140 grams of 72% aqueous perchloric acid (equivalent to one mole of perchloric acid) was added. The flask was evacuated to 1 mm. pressure and the mixture was agitated under continued vacuum for 90 minutes at 25° C. The water was collected and measured and approximately 18 grams was collected. The acrylamide perchlorate was a viscous liquid which analyzed as follows:

Calc'd for acrylamide perchlorate (as the monohydrate): N=7.39%. Found: N=7.20%.

Azobis(isobutyronitrile) (0.05% on the weight of the monomer) was then added. After curing overnight at 50° C., the polymer was hard and transparent. It had a burning rate of one inch per second at 500 p.s.i. and had a brittle point slightly above room temperature. The unaltered polymer was hygroscopic and softened considerably when exposed to air.

EXAMPLE II

Comparable results were obtained when equimolar quantities of methacrylamide, t-octylacrylamide, N-methylacrylamide, N,N-diethylacrylamide, and N,N-dimethylmethacrylamide were substituted for acrylamide and reacted under the conditions set forth in Example I.

EXAMPLE III

A plasticized binder composition of the following composition was prepared:

| | Percent |
|---|---|
| Acrylamide perchlorate | 79.93 |
| Ethylene glycol | 20.0 |
| N-nitrosodiphenylamine | .02 |
| Azoisobutyronitrile | .05 |

The propellant was prepared by charging 5 moles of acrylamide containing 0.02% by weight of N-nitrosodiphenylamine to a three-neck flask equipped with stirrer. The equivalent of 5 moles of perchloric acid was then added (700 grams, as 72% perchloric acid). Vacuum was applied and the mass was stirred. The reaction temperature was maintained at 30° C. until approximately 90 grams of water had been removed. The reaction time was two hours.

To 80 parts by weight of the acrylamide perchlorate prepared as set forth above was added 20 parts by weight of ethylene glycol and 0.05 part by weight of azobis(isobutyronitrile). The solution was poured into a mold and cured for 24 hours at 30° C. to 45° C.

The cured composition was clear and flexible. Its impact sensitivity was 25 inches for 50% fire level with a one kg. weight. Burning rates ranged from 0.17 in./sec. at 500 p.s.i. to 0.33 in./sec. at 2000 p.s.i.

EXAMPLE IV

There was no appreciable difference in the cured composition when an equimolar amount of methacrylamide was substituted for the acrylamide as used in Example III.

EXAMPLE V

A propellant charge with the following composition (percent on a weight basis) was prepared:

| | Percent |
|---|---|
| Acrylamide perchlorate | 29.10 |
| Ethylene glycol | 17.50 |
| EGDM [1] | 3.25 |
| Ammonium perchlorate (35μ) | 50.00 |
| Inhibitor [2] | 0.1 |
| Catalyst [3] | 0.05 |

[1] EGDM is ethylene glycol dimethacrylate.
[2] The inhibitor used was 2,3-dicyanobenzoquinone. The same quantity of methylene blue was also effective.
[3] The catalyst used was azobis(isobutyronitrile).

The propellant was prepared as follows:

The acrylamide, EGDM and inhibitor were charged to a three-neck flask equipped with stirrer and means for evacuation. The perchloric acid was then added and the flask evacuated to 0.05 mm. A pressure of 0.05 to 1.0 mm. was maintained throughout the reaction period and the temperature was maintained at 25° to 27° C. The reaction time was 85 minutes. The ethylene glycol was then added, and the mixture was stirred under vacuum for 20 minutes. The ammonium perchlorate was then added and the mixture again stirred under vacuum for 20 minutes. The catalyst was then added and stirring continued until the catalyst was evenly distributed (about 15 minutes).

The batch was cast into Teflon coated molds and polymerized for 16 hours at 45° C.

The physical properties of the cured composition are shown in Table I.

TABLE I.—PHYSICAL PROPERTIES

| Temperature, °F. | Tensile, p.s.i. | Elongation, percent |
|---|---|---|
| −40 | 238 | 21 |
| 75 | 21 | 68 |
| 135 | 26 | 22 |

EXAMPLE VI

A propellant charge was prepared as set forth in Example V using methacrylamide in place of acrylamide, and substituting benzoyl peroxide as catalyst for the azobis(isobutyronitrile). The polymerization proceeded smoothly and the cured or polymerized propellant exhibited properties in the same range as shown by the propellant of Example V. It was noted that methacrylamide perchlorate polymerized more slowly than acrylamide perchlorates, and thus a wider choice of catalysts is available.

We claim:
1. Compounds selected from the group consisting of (1) monomers of the formula

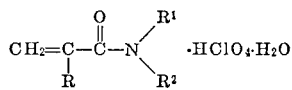

in which R, $R^1$ and $R^2$ are selected from the group consisting of hydrogen and a lower alkyl group containing 1 to 8 carbon atoms, (2) polymers selected from the group consisting of polymers of the formula:

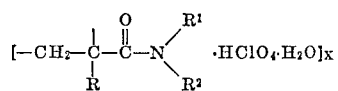

wherein R, $R^1$ and $R^2$ are selected from the group consisting of hydrogen and a lower alkyl group containing 1 to 8 carbon atoms, and X is an integer from 5 to 5000, and (3) copolymers of monomers of the formula:

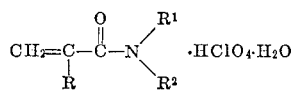

in which R, $R^1$ and $R^2$ are as described hereinbefore, with a monoethylenically unsaturated polymerizable compound selected from the group consisting of methyl acrylate, ethyl acrylate, butyl acrylate, 2-ethylhexyl acrylate, the higher alkyl esters of methacrylic and ethacrylic acids, propyl acrylate, isopropyl acrylate, tert-butyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxypropyl acrylate, ethoxyphenyl acrylate, ethoxybenzyl acrylate, ethoxycyclohexyl acrylate, the corresponding esters of methacrylic acid, styrene, vinyltoluene, vinylnaphthalene, dialkyl maleates, dialkyl fumarates, dialkyl crotonates, dialkyl itaconates, and dialkyl glutaconates.

2. Polymers as set forth in claim 1 containing a small but plasticizing amount of a polyhydric alcohol selected from the group consisting of ethylene glycol, triethylene glycol, propylene glycol, glycerol, and 1,2,6-hexanetriol.

3. Copolymers as set forth in claim 1 in which the ethylenically unsaturated polymerizable compound is an alkyl acrylate.

4. Acrylamide and alkyl acrylamide perchlorate salts of the formula

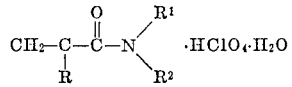

wherein R is a group selected from the group consisting of hydrogen and an alkyl group containing from 1 to 8 carbon atoms, $R^1$ and $R^2$ are groups individually selected from the group consisting of hydrogen and lower alkyl, said lower alkyl group containing 1 to 8 carbon atoms.

5. Copolymers of monomers of the formula

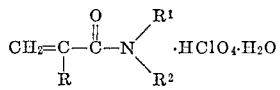

wherein each R, $R^1$, and $R^2$ are selected from the group consisting of hydrogen and alkyl containing from 1 to 8 carbon atoms with polyethylenically unsaturated monomers selected from the group consisting of divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinyl sulfone, polyvinyl or polyallyl ethers of glycol, of glycerol, of pentaerythritol, of mono-, or dithio-derivatives of glycols, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicate, triallyl tricarballylate, triallyl aconitate, triallyl citrate, triallyl phosphate, N,N'-methylenediacrylamide, N,N'-methylenedimethacrylamide, N,N' - ethylenediacrylamide, 1,2-di(α-methylmethylenesulfonamido)ethylene, trivinylbenzene, trivinylnaphthalene, polyvinylanthracenes, butadiene and isoprene.

6. Acrylamide perchlorate.

7. Methacrylamide perchlorate.

8. A process for the preparation of acrylamide and alkyl acrylamide perchlorate salts of the general formula:

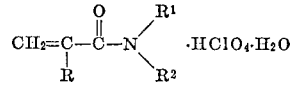

wherein R is a group selected from the group consisting of hydrogen and an alkyl group containing from 1 to 8 carbon atoms, $R^1$ and $R^2$ are groups selected from the group consisting of hydrogen and lower alkyl, said lower alkyl group containing 1 to 8 carbon atoms, which comprises reacting the acrylamide with perchloric acid and recovering the acrylamide perchlorate salt from the reaction mixture.

9. A process as set forth in claim 8 in which the reaction temperature is from about 20° C. to about 35° C.

10. A process as set forth in claim 8 in which the perchloric acid used is an aqueous solution with a concentration of about 72% perchloric acid.

11. A process as set forth in claim 10 in which the process is conducted under a pressure of from about 0.5 to about 50 mm. of mercury.

12. A process as set forth in claim 10 in which the process is conducted under a pressure of from about 0.5 to 10 mm. of mercury.

13. Poly(acrylamide perchlorate).
14. Poly(methacrylamide perchlorate).

References Cited

UNITED STATES PATENTS

| | | | |
|---|---|---|---|
| 2,653,975 | 9/1953 | Mowry et al. | 260—561 |
| 2,683,173 | 7/1954 | Weisgerber | 260—561 |
| 2,806,881 | 9/1957 | Porter | 260—561 |
| 2,682,461 | 6/1954 | Hutchison | 52—0.5 |
| 2,740,702 | 4/1956 | Mace | 52—0.5 |

LELAND A. SEBASTIAN, *Primary Examiner.*

U.S. Cl. X.R.

260—33.4, 80, 82.1, 83.5, 88.1, 88.3, 89.5, 561; 149—19, 20, 44, 75, 109; 260—63, 78.5, 79.3, 79.7